United States Patent [19]

Phillips

[11] 4,089,131

[45] May 16, 1978

[54] APPARATUS FOR SEPARABLY COUPLING A SAMPLE CONTAINER TO A SAMPLE GATHERING DEVICE

[75] Inventor: William H. Phillips, Saginaw, Mich.

[73] Assignee: Trippensee Corporation, Saginaw, Mich.

[21] Appl. No.: 773,955

[22] Filed: Mar. 3, 1977

[51] Int. Cl.² .............................................. A01K 73/00
[52] U.S. Cl. ......................................... 43/4; 285/260; 285/321
[58] Field of Search ............... 285/321, 468, 260, 372, 285/371, 242, 244, 255, 421; 403/299; 43/4, 8, 11

[56] References Cited

U.S. PATENT DOCUMENTS

| 1,560,254 | 11/1925 | Jackson | 73/421 B |
| 2,947,071 | 8/1960 | Marchant | 285/260 X |
| 3,207,535 | 9/1965 | Wilson | 285/321 X |
| 3,212,795 | 10/1965 | Helm et al. | 285/260 X |
| 3,565,464 | 2/1971 | Wolf | 285/321 X |

FOREIGN PATENT DOCUMENTS

| 741,698 | 8/1966 | Canada | 285/255 |
| 1,314,716 | 12/1962 | France | 285/321 |

Primary Examiner—Wayne L. Shedd
Attorney, Agent, or Firm—Learman & McCulloch

[57] ABSTRACT

Apparatus for separably coupling one end of a sample container to an open end of a sample gathering net comprises an annular body adapted to be secured to the one end of the container and removably telescoped within the open end of the net. An elastomeric retainer encircles the end of the net and the body member and is accommodated in an annular groove formed in the body member. An annular anchor member encircles the elastomeric retainer and applies a radially compressive force on the latter to clamp the open end of the net in the groove of the body member. The anchor member has an annular groove in which the retainer seats to latch the body and anchor members together, the groove in the anchor member being of less depth than that of the groove in the body member.

9 Claims, 3 Drawing Figures

APPARATUS FOR SEPARABLY COUPLING A SAMPLE CONTAINER TO A SAMPLE GATHERING DEVICE

The invention disclosed herein relates to plankton sampling equipment of the kind having a conical gathering net adapted to be towed through a body of water and being coupled at its smaller diameter end to a container in which the sample may be collected. The net is separably coupled to the container by means of annular, telescoping members between which the net is accommodated. The net is clamped between the annular members by an elastomeric, annular retainer.

In the collection of plankton samples it is conventional to secure the smaller end of a conical net to the open end of a sample container and to move the assembled net and container through the body of water. Although there are many different kinds of devices currently available for coupling a net and a container, not all of them are satisfactory for a number of reasons. For example, many of the known coupling devices require the use of tools to couple and uncouple a net to and from a container. In many instances, the use of tools is inconvenient and awkward, particularly in cold weather. Other known kinds of coupling devices are objectionable for the reason that they distort or otherwise injure that end of the net which is to be coupled to the container. Still others of the known devices enable parts of samples to become trapped between the container and the means by which the container is clamped to the net, thereby resulting in the contamination of subsequent samples taken with the same sampling apparatus.

Another common objection applicable to known coupling devices is their reliance upon metallic parts for the clamping apparatus. It is desirable to avoid the use of metal in and around the sample collecting device so as to restrict as much as possible outside influences on the sample due to chemical reactions between the metal and water, particularly when the water is sea water.

Coupling apparatus constructed according to the invention overcomes or greatly minimizes all of the foregoing objectionable characteristics of known devices for similar purposes by utilizing non-metallic, inert components comprising an annular body which may be screwed to and unscrewed from a sample container and to which the open end of a gathering net may be separably coupled by means of an elastomeric ring formed of compressibly deformable material and which encircles both the end of the net and the body. The elastomeric ring securely attaches the net to the aforementioned annular body by means of an anchor sleeve which encircles the elastomeric ring and urges it forcibly into engagement with the annular body. The anchor sleeve is axially movable relative to the net by the application of pushing or pulling forces on the sleeve, thereby dispensing with the need for any tools to effect coupling and uncoupling of the net to and from the sample container.

A preferred embodiment of the invention is disclosed in the accompanying drawings wherein.

Figure 1:
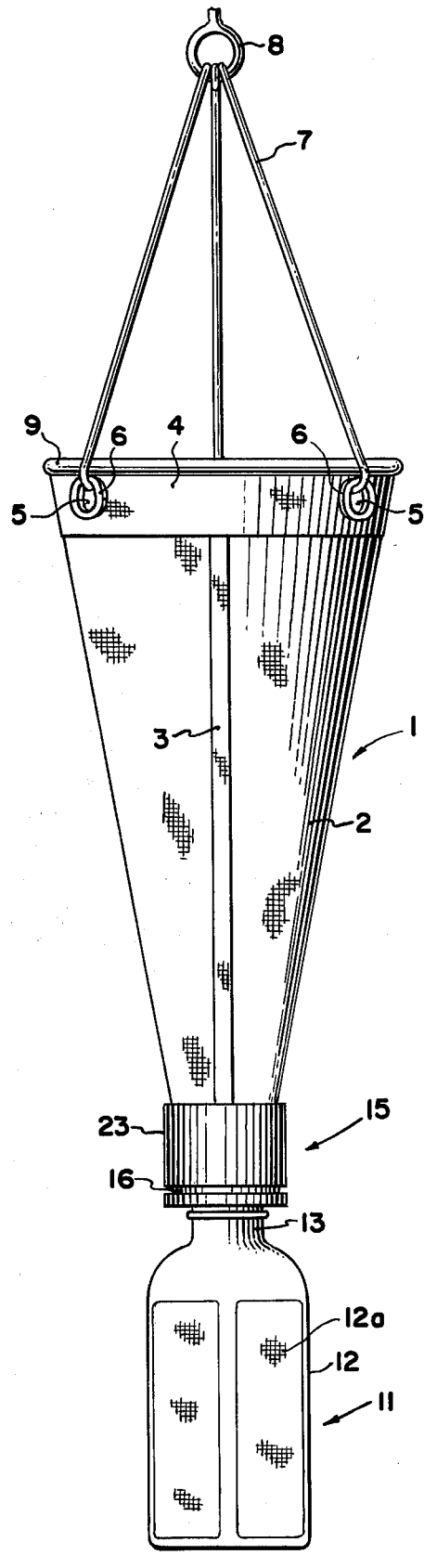
FIG. 1 is an elevational view illustrating a typical plankton gathering net coupled to a sample container.

Coupling apparatus constructed in accordance with the invention is adapted for use in conjunction with any one of a number of different kinds of conical sample gathering nets 1 comprising a tapering body 2 formed of nylon or other netting material and equipped with axially extending reinforcing strips 3, as is conventional. At its larger diameter end, the body 2 has a reinforcing band 4 of suitable material and is provided with openings 5, reinforced by suitable grommets 6, through which a towing bridle 7 passes. The bridle is connected to a ring 8 which may be attached to one end of a towline. Preferably, a rigid hoop 9 is fitted at the larger diameter end of the body 2 so as to maintain that end of the body open. The smaller diameter end of the body 2 preferably includes a short, cylindrical neck portion 10.

The gathering net 1 is adapted to be fitted to a container 11 which, in the disclosed embodiment, comprises a cage 12 formed of a suitable plastic material and enclosing a suitable screen 12a. At one end of the body is an open neck 13 provided with an external thread 14.

The coupling apparatus is designated generally by the reference character 15 and comprises an annular body 16 formed of polyurethane or the like having at one end a cylindrical bore 17 provided with a thread 18 for threaded engagement with the threaded neck of the container 11. The bore 17 terminates in a shoulder 19 adapted to seat in sealing engagement upon the free end of the container neck 13. From the shoulder 19 the bore 17 preferably has a flared or tapered surface 20. Between its ends the body 16 is provided with an external, annular groove 21, the upper and lower edges of which preferably are rounded.

Figure 2:
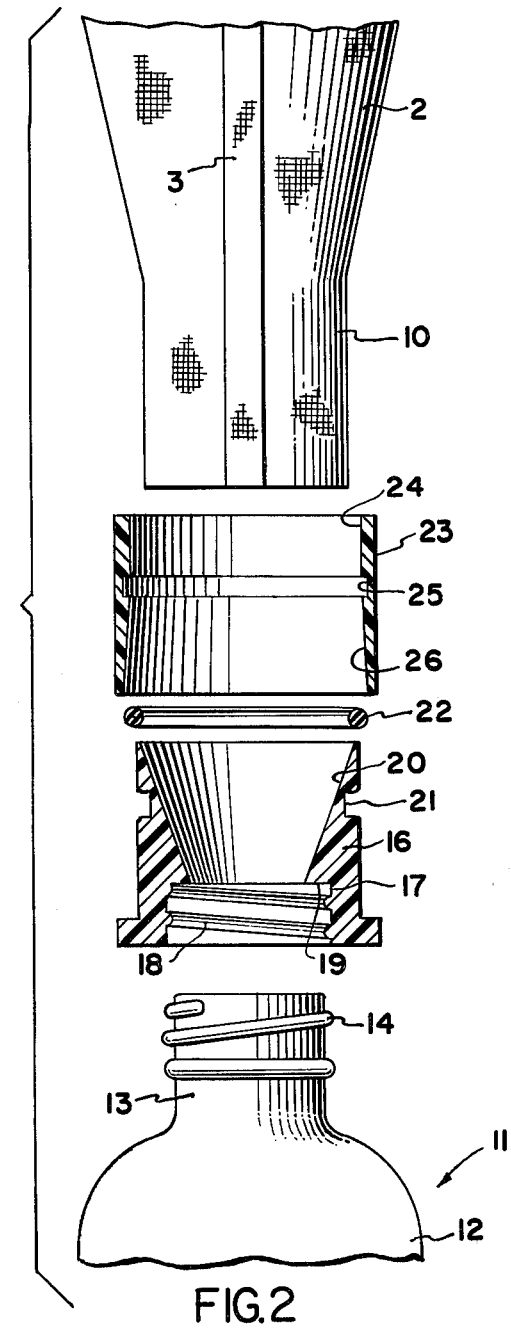
FIG. 2 is an enlarged, fragmentary exploded view, partly in elevation and partly in section, of the apparatus shown in FIG. 1.

The coupling apparatus also includes a retaining ring 22 formed of an elastomeric, rubbery material which is deformable under compressive force. As is best shown in FIG. 2, the inside diameter of the retainer 22, when the latter is relaxed, is somewhat less than the outside diameter of the body 16 and the outside diameter of the retainer is somewhat larger than that of the body 16.

The coupling apparatus also includes an annular anchor sleeve 23 formed of polyurethane or the like having at its upper end a cylindrical bore 24. Between its ends the anchor member 23 is provided with an annular, internal groove 25. From the groove 25 the bore 24 has a downwardly flaring surface 26. The minimum diameter of the bore 24 is larger than the outside diameter of the body 16 for a purpose presently to be explained.

The height of the grooves 21 and 25 is substantially uniform, but the depth of the groove 21 is greater than the depth of groove 25. The depth of the groove 21 preferably is substantially three-fourths the thickness of the retainer 22, and the depth of the groove 25 is about one-fourth the thickness of the retainer.

To assemble the coupling apparatus with the net 1, the members 16, 22 and 23 first are disassembled, following which the anchor sleeve 23 is telescoped over the neck 10 of the net. Thereafter, the retaining ring 22 similarly is telescoped over the neck 10. The body 16 then is fitted into the net neck 10 so that the latter encircles the body. In these positions of the parts, the retaining ring may be moved downwardly so as to encircle both the neck 10 and the body 16, the ring 22 being radially expanded as it is moved into encircling relation with the body 16.

Figure 3:
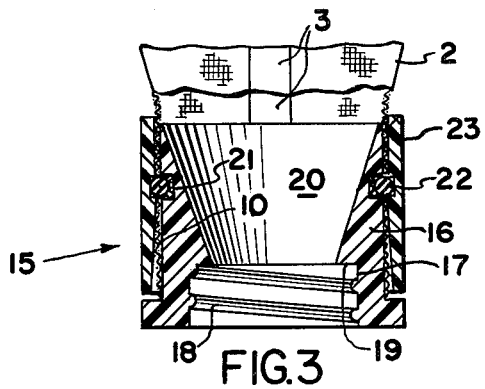
FIG. 3 is a vertical sectional view illustrating the coupling apparatus secured to the net.

Downward movement of the ring 22 relative to the neck 10 and the body 16 continues until such time as the ring reaches the level of the groove 21, whereupon the ring will contract, forcing the adjacent portion of the neck 10 into the groove 21. Thus, both the ring 22 and the adjacent portion of the neck 10 will be accommodated in the groove 21, as is shown in FIG. 3, and the resilience of the ring 22 will yieldably and releasably maintain the neck 10 and the ring 16 in telescoped assembly.

After the ring 22 has been seated in the groove 21 the anchor ring 23 may be slid downwardly into encircling relation with the ring 22. The tapered portion 26 of the bore 24 will facilitate such movement of the ring 23 and the disparity between the diameters of the body 16 and the bore 24 will enable the reinforcing strips 3 to be accommodated between the members 16 and 23 without interference.

As downward movement of the sleeve 23 continues, the tapered bore surface 26 will exert an ever increasing radially compressive force on the ring 22. Compression of the ring 22 causes the latter to be deformed into the groove 21, as is permitted by the axial width of the latter, thereby enabling downward movement of the sleeve 23 to progress to the point at which the groove 25 overlies the groove 21. At this time, the resilience of the ring 22 will enable it to recover somewhat from its deformed condition and occupy the groove 25, thereby providing a secure, but nevertheless releasable, latching of the members 16 and 23 to one another. In these positions of the parts, that portion of the neck 10 which occupies the groove 21 will be securely retained therein so as to preclude inadvertent separation of the net from the coupling mechanism.

Following the assembly of the coupling apparatus and the net 1 the threaded neck 13 of the container 11 may be fitted into the bore 18 of the body 16.

When the coupling apparatus is assembled with the net 1, the connection between the neck 10 and the body 16 is extremely secure, but the neck 10 is subjected to virtually no stress tending to tear the material from which the neck 10 is formed.

In the assembled condition of the parts, the upper edge of the sleeve 23 projects slightly above the corresponding edge of the body 16 and the space between these portions of the members 16 and 23 will be occupied by the net neck 10, thereby minimizing the possibility of collection of water between the members 16 and 23.

When the assembled apparatus is drawn through water, the tapered bore surface 20 of the body 16 diverts or deflects water toward the axis of the container neck 13, rather than toward the rim of the neck. Consequently, the risk of seepage past the seal provided by the shoulder 19 is minimized.

When it is desired to uncouple the net 1 from the coupling apparatus 15, the anchor sleeve 23 may be slid upwardly from the position shown in FIG. 3 toward the position shown in FIG. 2, thereby exposing and permitting access on the ring 22, following which the ring and the neck 10 may be removed from the groove 21. The assembly and disassembly of the net 1 and the coupling apparatus, therefore, may be effected without the use of tools by the application of axial forces on the anchor sleeve 23.

The disclosed embodiment is representative of a presently preferred form of the invention, but is intended to be illustrative rather than definitive thereof. The invention is defined in the claims.

We claim:

1. Sample taking apparatus comprising a sample container having an open end, a gathering device having a pliable sleeve at one end, and means sealably and separably coupling said container and said device, said coupling means comprising an annular body member fitted into said sleeve, said body member having an annular groove therein; an annular anchor member concentrically assembled with said body member with said sleeve therebetween, said anchor member having an annular groove confronting the groove in said body member; an annular, endless retainer accommodated in the groove of one of said members and projecting beyond its periphery into the groove of the other of said members, thereby causing an annular portion of said sleeve also to be accommodated in the groove of said other of said members; and means separably joining said container at its open end to one of said members.

2. Apparatus according to claim 1 wherein the groove in one of said members has a depth less than that of the groove in the other of said members.

3. Apparatus according to claim 2 wherein the groove in said body member has the greater depth.

4. Apparatus according to claim 1 wherein said anchor member is external of said body member.

5. Apparatus according to claim 1 wherein said body member has a bore extending therethrough, said bore having a shoulder between its ends on which said open end of said container may seat.

6. Apparatus for sealably coupling a sample gathering device to a sample container, said apparatus comprising an annular body member; an annular anchor member concentrically assembled with said body member and having a diameter different from that of said body member to provide an annular space between said members for the accommodation of a portion of said gathering device, each of said members having an annular groove therein and said members being so assembled that said grooves confront one another; and annular, endless retainer sandwiched between said members, said retainer spanning said annular space and being accommodated in both of said grooves; and means carried by one of said members for separable connection to said sample container.

7. Apparatus according to claim 6 wherein said retainer is composed of elastomeric material capable of compressive deformation.

8. Apparatus according to claim 6 wherein one of said grooves has a depth greater than that of the other of said grooves.

9. Apparatus according to claim 6 wherein the groove in said body member has a depth greater than that of the groove in said anchor member.

* * * * *